United States Patent
Okaue

(10) Patent No.: US 6,732,246 B2
(45) Date of Patent: May 4, 2004

(54) MEMORY APPARATUS AND MEMORY ACCESS RESTRICTING METHOD

(75) Inventor: Takumi Okaue, Kanagawa (JP)

(73) Assignee: Sony Corporation (JP)

( * ) Notice: Subject to any disclaimer, the term of this patent is extended or adjusted under 35 U.S.C. 154(b) by 72 days.

(21) Appl. No.: 09/967,002

(22) Filed: Sep. 28, 2001

(65) Prior Publication Data
US 2002/0069315 A1 Jun. 6, 2002

(30) Foreign Application Priority Data
Sep. 29, 2000 (JP) ..................................... P2000-300973

(51) Int. Cl.[7] .............................................. G06F 12/00
(52) U.S. Cl. ........................ 711/163; 711/152; 711/164
(58) Field of Search .......................... 711/102–103, 1, 711/152, 163–164, 153; 365/185.04–185.11

(56) References Cited

U.S. PATENT DOCUMENTS

| | | | | |
|---|---|---|---|---|
| 5,014,191 A | * | 5/1991 | Padgaonkar et al. | 711/163 |
| 5,293,610 A | * | 3/1994 | Schwarz | 711/164 |
| 5,454,096 A | * | 9/1995 | Otsuka et al. | 711/1 |
| 5,829,014 A | * | 10/1998 | Hayashi | 711/103 |
| 5,991,197 A | * | 11/1999 | Ogura et al. | 365/185.11 |
| 5,991,858 A | * | 11/1999 | Weinlander | 711/163 |
| 6,009,012 A | * | 12/1999 | Sibigtroth et al. | 365/185.04 |
| 6,125,054 A | * | 9/2000 | Yusa et al. | 365/185.04 |
| 6,160,734 A | * | 12/2000 | Henderson et al. | 365/185.04 |

* cited by examiner

*Primary Examiner*—Nasser Moazzami
(74) *Attorney, Agent, or Firm*—Lerner, David, Littenberg, Krumholz & Mentlik, LLP

(57) ABSTRACT

When the power of a memory apparatus is turned on, data written to a designated area of a memory of the memory apparatus is loaded to a register. When an initial state detecting portion has determined that the data loaded to the register is an initial value, gates are turned on. As a result, the designated area and a memory area are access-permitted. When an access code is written from the outside to the designated area, the memory apparatus is access-restricted. When a code that matches the access code is written from the outside to the write register, a match detection output of a comparing circuit causes another gate to be turned on. As a result, the memory area can be accessed. When a code that does not match the access code is written from the outside to the write register, the memory area cannot be accessed.

19 Claims, 4 Drawing Sheets

MEMORY APPARATUS AND MEMORY ACCESS RESTRICTING METHOD

CROSS-REFERENCE TO RELATED APPLICATIONS

The present application claims priority from Japanese Application No. P2000-300973 filed Sep. 29, 2000, the disclosure of which is hereby incorporated by reference herein.

BACKGROUND OF THE INVENTION

The present invention relates to a memory apparatus and a memory access restricting method using a reversibly non-writable memory.

A reversibly non-writable memory in which data can be written one time is known. For example, as a semiconductor memory, so-called OTP (One Time Programmable ROM) in which data can be written one time has been proposed. The related art reference is a non-volatile reversibly non-writable memory. In other words, according to the related art reference, once data is written, it cannot be erased. Thus, even if the power of the memory is turned off, written data is kept retained. The reversibly non-writable memory can be fabricated at a lower cost than the flash memory.

Recently, the commercial use of the card type flash memories as data record mediums has tended to increase. For example, still pictures photographed by a digital camera are recorded to a flash memory. To protect the privacy of the user, it is necessary to improve the secrecy of data recorded in a flash memory.

As another problem of the flash memory, the cost thereof is relatively high.

SUMMARY OF THE INVENTION

Therefore, an object of the present invention is to provide a memory apparatus and an access restricting method that allow the secrecy of data written thereto to be improved using a characteristic of a reversibly non-writable memory.

To solve the above-described problem, a first aspect of the present invention is a memory apparatus including a reversibly non-writable memory having a designated area and other areas, a detecting unit operable to determine whether the designated area of the memory is in an initial state, and a controller operable to permit access to the designated area and the other areas of the memory when the detecting unit determines that the designated area is in the initial state, and to prohibit access to the designated area and the other areas of the memory when the detecting unit determines that the designated area is not in the initial state.

A second aspect of the present invention is a method for restricting access to a reversibly non-writable memory apparatus, including determining an access state of the memory apparatus; when the memory apparatus is in an access-restricted state, changing the access state of the memory apparatus to an access-permitted state; and when the memory apparatus is in the access-permitted state, changing the access state of the memory apparatus to the access-restricted state.

According to the present invention, when the designated area is in an initial state, the area is not access-restricted. When the designated area is not in the initial state, the area can be access-restricted. When the area has been access-restricted, the area can be changed to the access permitted state.

These and other objects, features and advantages of the present invention will become more apparent in light of the following detailed description of a best mode embodiment thereof, as illustrated in the accompanying drawings.

DETAILED DESCRIPTION

Figure 1:
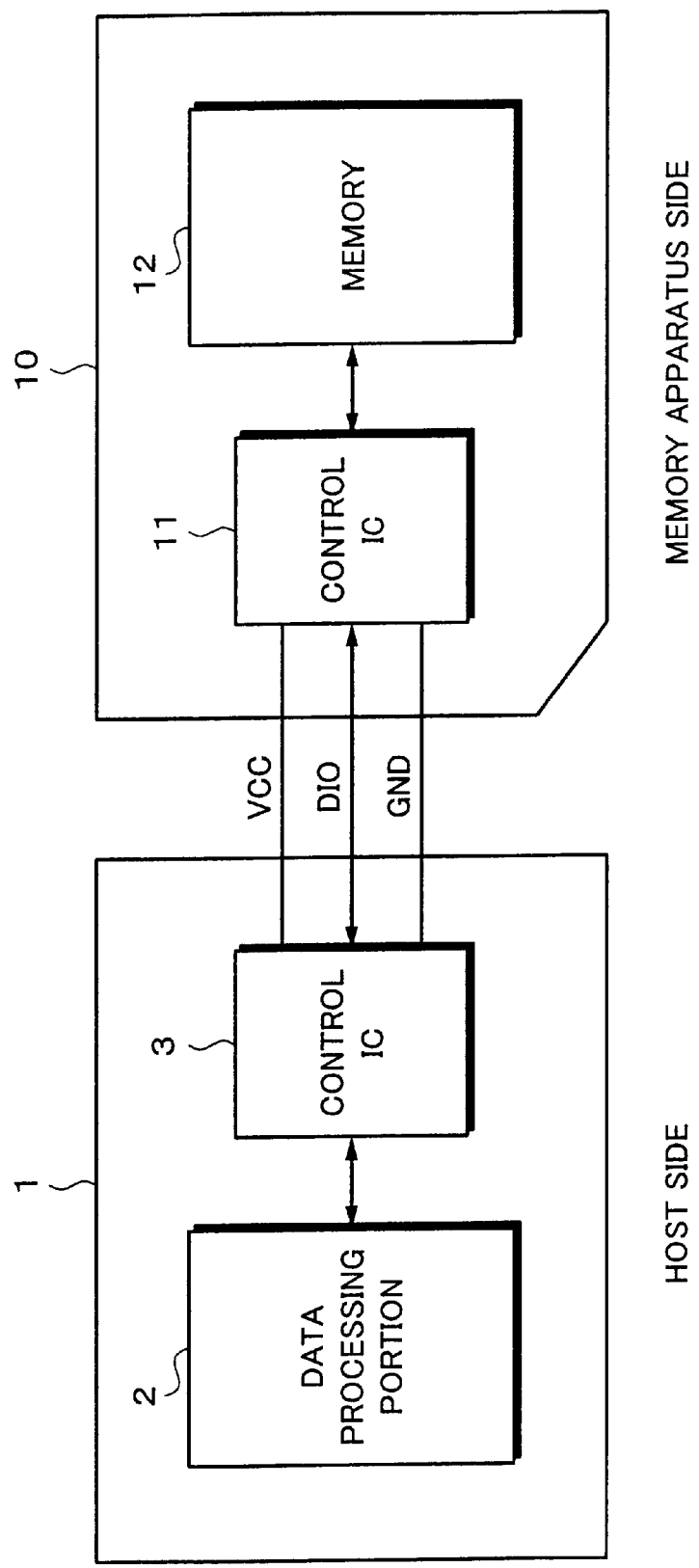
FIG. 1 is a schematic diagram showing an example of the structure of a system according to an embodiment of the present invention.

FIG. 1 shows an outline of the structure of a system according to an embodiment of the present invention. Referring to FIG. 1, a host side and a memory apparatus side are connected through a serial interface. A host side data processing device 1 has a data processing portion 2 and a control IC 3. A memory apparatus 10 has a control IC 11 and a memory 12. The memory apparatus 10 has a card-shaped structure attachable to and detachable from the data processing device 1.

The data processing portion 2 generates data written to the memory apparatus 10. In addition, the data processing portion 2 reads data from the memory apparatus 10 and performs various data processes for data that is read from the memory apparatus 10. For example, the data processing device 1 may be a digital electronic camera. A photographed picture may be written to the memory apparatus 10. In addition, a picture may be read from the memory apparatus 10. Another example of the data processing device 1 is an audio recording/reproducing device. Compressed audio data may be written to the memory apparatus 10. In addition, compressed audio data may be read from the memory apparatus 10.

Each of the control ICs 3 an 11 comprises a parallel-serial converting circuit, a buffer memory (that temporarily stores data), and an interface circuit. A power line VCC, a data line DIO, and a ground line GND are disposed between the control ICs 3 and 11. A command and write data are transferred from the data processing device 1 to the memory apparatus 10 through the data line DIO. Read data is transferred from the memory apparatus 10 to the data processing device 1 through the data line DIO. In addition, signal lines for transferring a clock signal, a chip select signal, a busy signal, an interrupt signal, and so forth are disposed (not shown).

Figure 2:
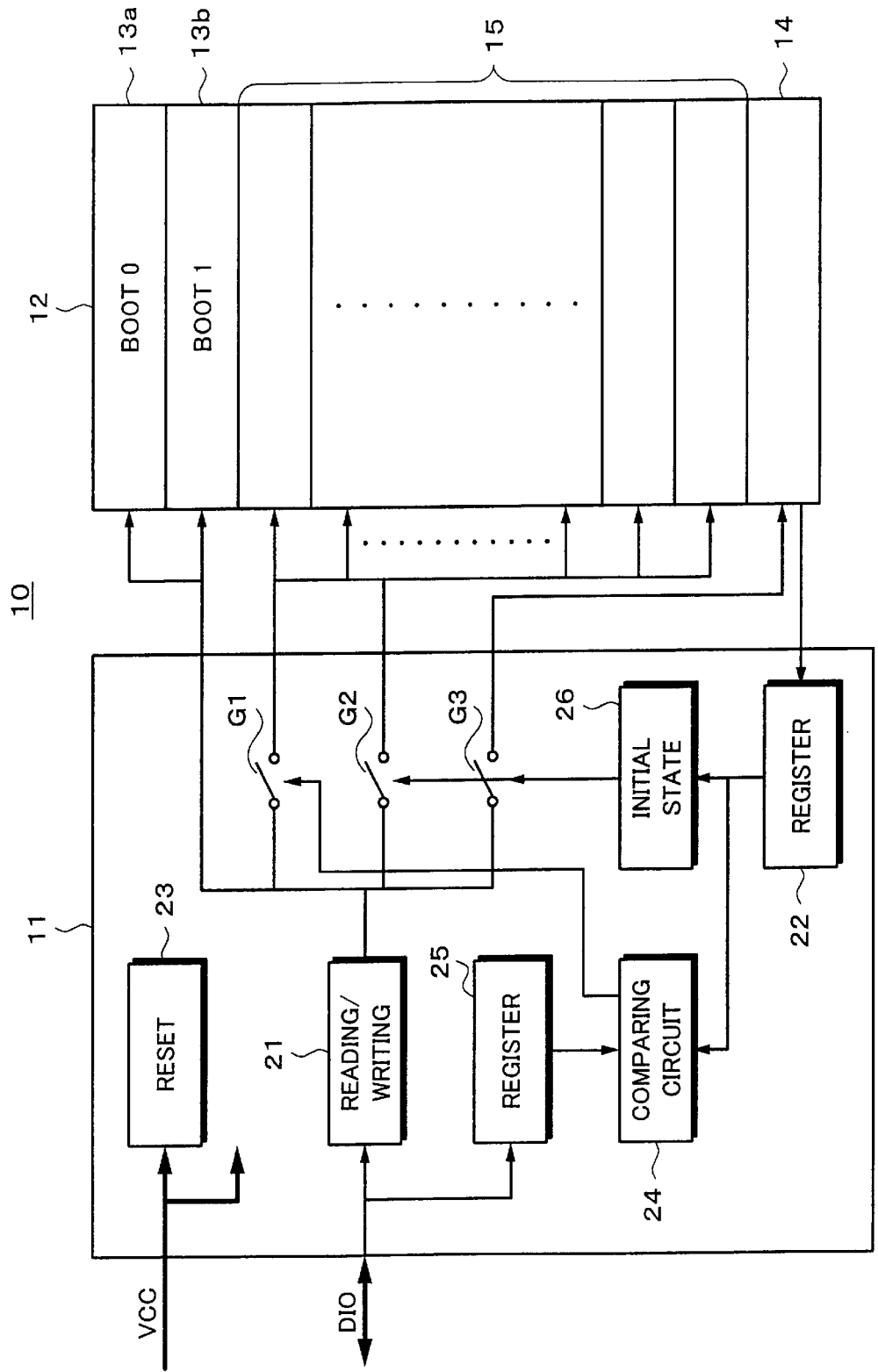
FIG. 2 is a block diagram showing an example of the structure of a memory apparatus according to the embodiment of the present invention.

FIG. 2 shows a detail of the structure of the memory apparatus 10 according to the embodiment. Data in a predetermined unit is read to and written from the memory 12. Predetermined two areas of the memory 12 are boot areas 13a and 13b. Various types of information such as attribute information are pre-recorded to the boot areas 13a and 13b. For example, information that represents whether the memory apparatus is a read-only memory, an access restricted memory, or a rewritable memory is pre-recorded to the boot areas 13a and 13b. In an environment in which a plurality of memory apparatuses having different characteristics may be used, characteristics of the memory apparatus are identified with the attribute information recorded in the boot areas 13a and 13b.

The boot areas 13a and 13b are areas that are initially read by the data processing device 1 when the memory apparatus 10 is attached thereto. The boot areas 13a and 13b are areas that are always readable. In addition, the memory 12 has a designated area 14. A memory area other than the boot areas 13a and 13b and the designated area 14 is denoted by reference numeral 15. Data is written/read using the memory area 15.

An access controlling portion 21 and a write register 25 are connected to the data line DIO of the control IC 11. The access controlling portion 21 controls the writing operation and reading operation for data to/from the memory 12. The access controlling portion 21 comprises a buffer memory (that stores data) and a register (that stores a command).

In addition, a reset signal generating portion 23 is connected to the power line VCC. The reset signal generating portion 23 monitors the voltage fluctuation of the power line VCC, detects the power on state of the memory apparatus 10, and generates a reset signal corresponding to the detection of the power on state. Data written to the designated area 14 is loaded to the register 22 corresponding to the reset signal. In addition, the write register 25 is reset. Thereafter, the contents (data) of the write register 25 become different from the initial value written to the designated area 14.

The access controlling portion 21 and the boot areas 13a and 13b of the memory 12 are connected. In addition, gates (switches) G1 and G2 are disposed in parallel between the access controlling portion 21 and the memory area 15 of the memory 12. Moreover, a gate (switch) G3 is disposed between the access controlling portion 21 and the designated area 14. Once each of the gates G1, G2, and G3 is turned on/off with a control signal, the state thereof is kept retained until the control signal is supplied.

An initial state detecting portion 26 is disposed in the control IC 11. The initial state detecting portion 26 detects whether or not data that is read from the designated area 14 to the register 22 corresponding to the reset signal is in the initial state. With a detected output of the initial state detecting portion 26, the on/off state of the gates G2 and G3 are controlled.

An output of the register 22 is supplied to one input of a comparing circuit 24. An output of the register 25 is supplied to another input of the comparing circuit 24. The comparing circuit 24 detects whether or not the outputs of the registers 22 and 25 match. With an output of the comparing circuit 24, the on/off state of the gate G1 is controlled. A sequencer (controller) (not shown) composed of a CPU is disposed in the control IC 11 shown in FIG. 2.

Figure 3:
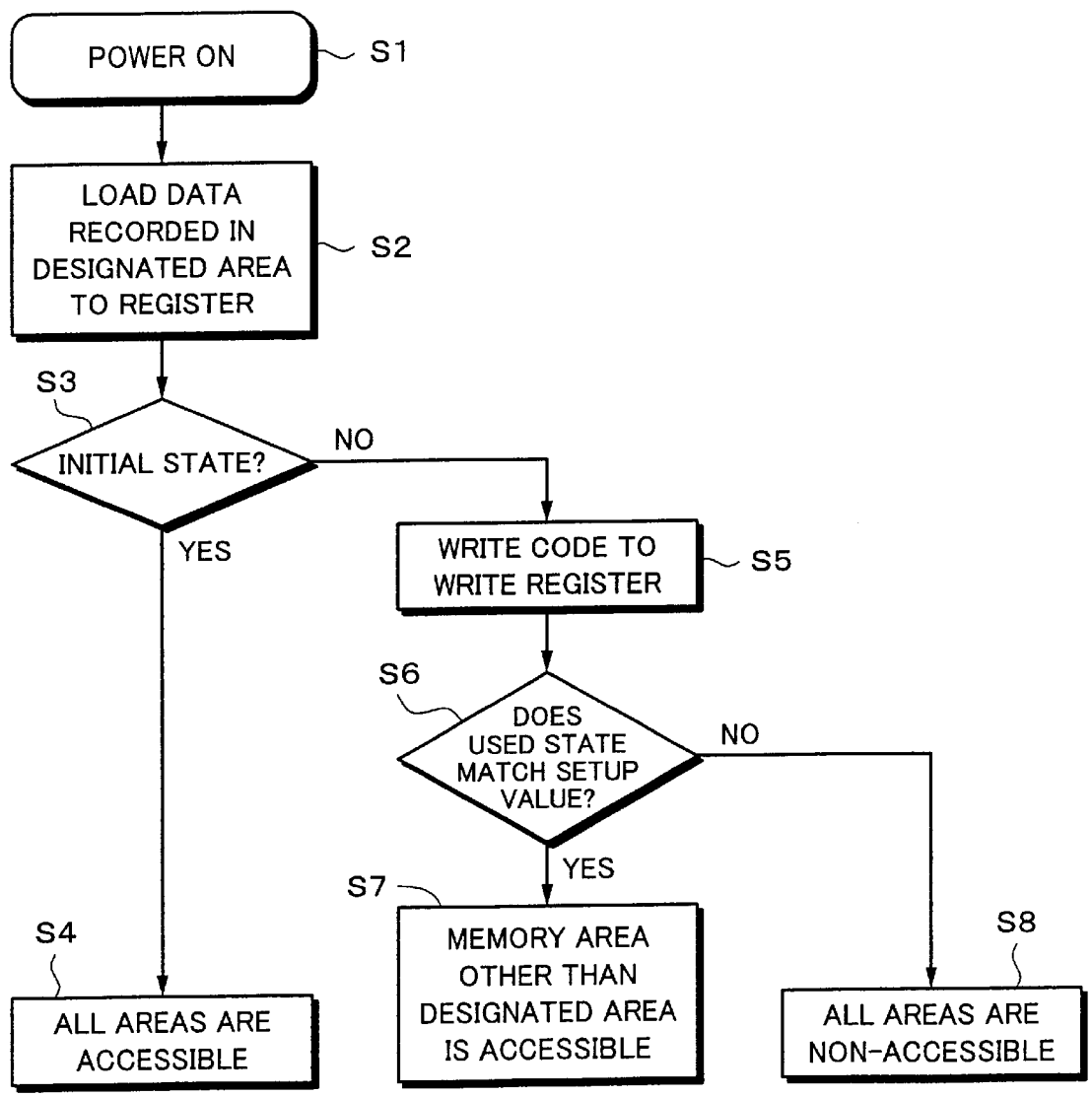
FIG. 3 is a flow chart for explaining the internal operation of the memory apparatus according to the embodiment of the present invention.

FIG. 3 is a flow chart for explaining the operation of the sequencer of the control IC 11 according to the embodiment of the present invention. At step S1, when the power is turned on, the reset signal generating portion 23 detects that the signal of the power line VCC goes high. As a result, the reset signal generating portion 23 generates the reset signal. With the reset signal, data recorded in the designated area 14 of the memory 12 is loaded to the register 22 of the control IC 11 (at step S2). In addition, the write register 25 is reset.

At step S3, the initial state detecting portion 26 detects whether or not code loaded to the register 22 is the initial value. In the initial state, data recorded in the designated area 14 is the initial value. The initial value is a value that has been written before the memory apparatus 10 is shipped to the user. The initial value is a code in which all bits are, for example, ones. In the initial state, with an output of the initial state detecting portion 26, the gates G2 and G3 are turned on.

When the gates G2 and G3 are turned on, all areas of the memory 12 can be accessed. These areas are the designated area 14 and the memory area 15 other than the boot areas 13a and 13b. When all the areas can be accessed, data written in the designated area 14 and the memory area 15 can be read and data can be written to a blank area. The contents of the write register 25 are reset to a value that is different from the initial value with the reset signal. Thus, the initial value loaded to the register 22 does not match the contents of the write register 25. Thus, the comparing circuit 24 does not generate a signal that causes the gate G1 to be turned on.

The user inputs code with a predetermined value that is different from the initial value to the data processing device 1. The code (referred to as access code) is supplied to the memory apparatus 10 through the data line DIO. The access code is written to the designated area 14 through the access controlling portion 21 and the gate G3. Thereafter, the user turns off the power of the memory apparatus 10. Since the memory 12 is a non-volatile memory, even if the power of the memory apparatus 10 is turned off, the access code written to the designated area 14 is not erased.

When the access code is written to the designated area 14, the determined result at step S3 indicates that the contents loaded from the designated area 14 are not the initial value. As a result, the gates G2 and G3 are turned off. In this state, since the gate G1 is turned off, the memory 12 cannot be accessed.

At step S5, the user inputs predetermined code to the data processing device 1 so as to write the predetermined code to the write register 25 of the control IC 11 of the memory apparatus 10. At step S6, the comparing circuit 24 compares the access code that is read from the designated area 14 and loaded to the register 22 with the code that is written to the write register 25 and determines whether or not they match.

When the determined result at step S6 indicates that the access code matches the code written to the write register 25, the gate G1 is turned on. Thus, at step S7, the memory area 15 other than the designated area 14 can be accessed. When the determined result at step S6 indicates that they do not match, the memory 12 cannot be accessed (at step S8) In such a manner, when the user writes code that matches the access code to the write register 25 of the control IC 11, the memory area 15 can be accessed.

Figure 4:
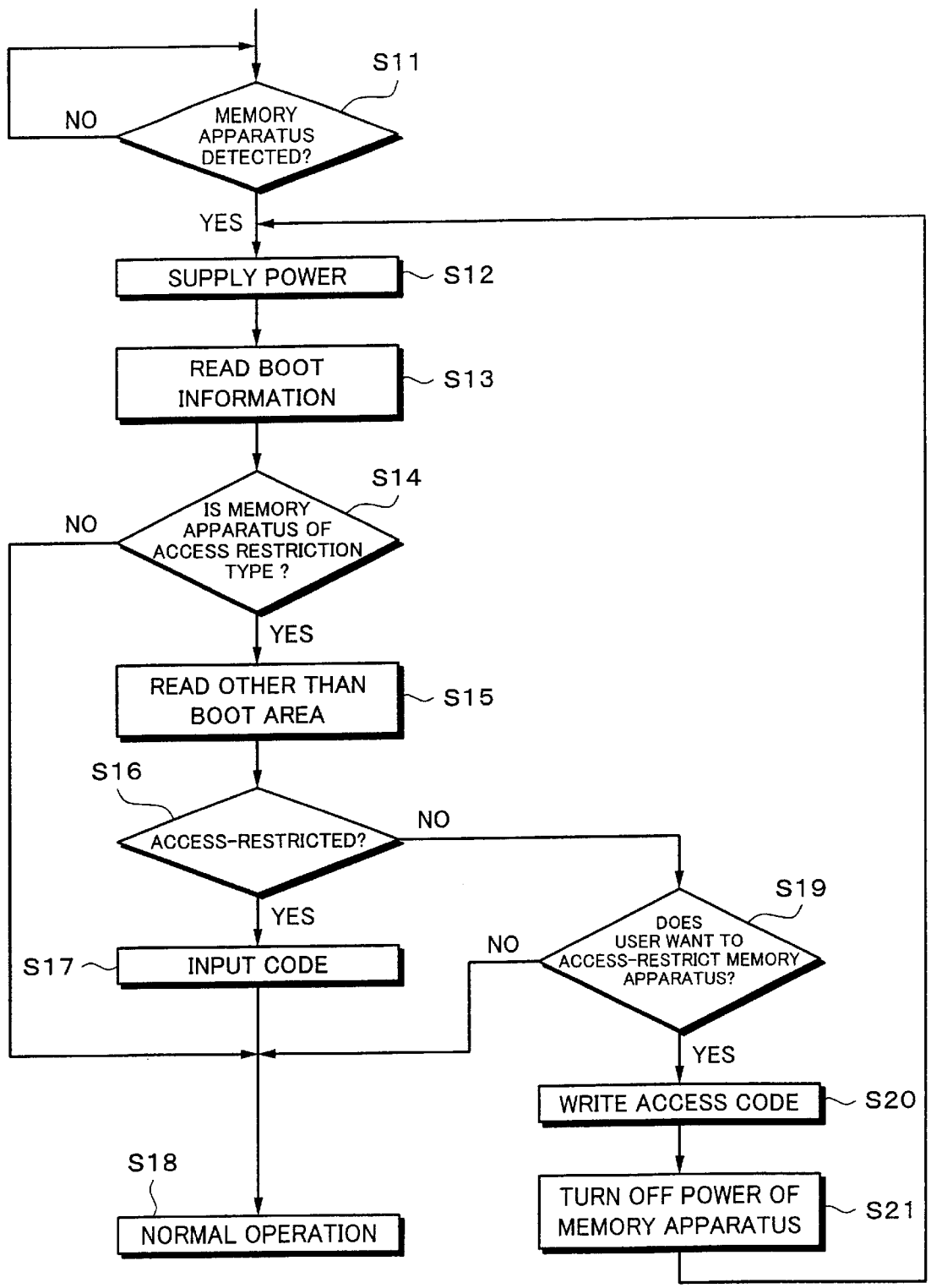
FIG. 4 is a flow chart for explaining an accessing method for the memory apparatus according to the embodiment of the present invention.

FIG. 4 is a flow chart for explaining an accessing method of the data processing device 1 to the memory apparatus 10. At step S11, the memory apparatus 10 is detected. When the memory apparatus 10 is attached to the data processing device 1, the power is supplied from the data processing device 1 to the memory apparatus 10 (at step S12). At step S13, the data processing device 1 reads boot information from the boot areas 13a and 13b of the memory 12.

Based on attribute information contained in the boot information, it is determined whether or not the attached memory apparatus is a memory apparatus of access restriction type (at step S14). In other words, as was described with reference to FIG. 3, a memory apparatus whose access state can be controlled is a memory apparatus of access restriction type. When the determined result at step S14 indicates that the memory apparatus is not of access restriction type, since the memory apparatus is of normal type, the flow advances to step S18.

When the attached memory apparatus is of access restriction type, areas other than the boot areas 13a and 13b (namely, the designated area 14 and the memory area 15) are read (at step S15). At step S16, it is determined whether or not, the attached memory device has been access-restricted. For example, a read command that causes data to be read from the designated area 14 and the memory area 15 is supplied from the data processing device 1 to the memory apparatus 10.

When data is transferred from the designated area 14 and the memory area 15 to the data processing device 1 corresponding to the read command, it is clear that all the areas can be accessed. Instead of the read command, a write command may be used. The state in which all the areas are accessible indicates that the memory apparatus 10 is in the initial state (namely, the memory apparatus 10 is not access-restricted). In contrast, when data cannot be transferred from both the designated area 14 and the memory area 15, all the areas are not accessible. In other words, it is determined that the memory apparatus 10 has been access-restricted. In this case, error information instead of data read from those areas is transferred from the memory apparatus 10 to the data processing device 1.

When the determined result at step S16 indicates that the memory apparatus 10 has been access-restricted, the flow advances to step S17. At step S17, the same code as the access code written in the designated area 14 is written to the write register 25 of the memory apparatus 10. Thus, the memory area 15 other than the designated area 14 becomes accessible (at step S18).

When the determined result at step S16 indicates that the memory apparatus 10 has not been access-restricted, the flow advances to step S19. At step S19, it is determined whether or not the user wants to access-restrict the memory apparatus 10. When the user does not want to access-restrict the memory apparatus 10, the access-restricting process is performed for the memory apparatus 10. Thus, since the memory apparatus 10 is still in the initial state, all the areas thereof are accessible. Thus, the memory apparatus 10 can be normally used (at step S18). In contrast, when the user wants to access-restrict the memory apparatus 10, the flow advances to step S20. At step S20, the user writes the access code to the write register 25 of the memory apparatus 10. The access code is transferred from the data processing device 1 to the memory apparatus 10. The access code is written to the designated area 14 through the access controlling portion 21 and the gate G3. At step S21, the user turns off the power of the memory apparatus 10.

In such a manner, the memory apparatus 10 is access-restricted. Thereafter, when the memory apparatus 10 is used, the flow returns to step S12. At step S12, the above-described process is performed. At step S16, it is determined that the memory apparatus 10 has been access-restricted. It is not always necessary to return the flow from step S21 to step S12. Alternatively, the flow may return from step S21 to step S15.

The present invention is not limited to the above-described embodiment. For example, when the power of the memory apparatus 10 is turned on, the initial state thereof is detected. Alternatively, when the memory apparatus 10 is attached to the data processing device 1, the initial state of the memory apparatus 10 may be detected. In addition, instead of the above-described access code, a password may be used. In addition, according to the above-described embodiment, based on the determined result of whether or not data read from the designated area matches the contents of the write register, the memory area 15 may be access-permitted. Alternatively, when a predetermined condition of the data read from the designated area and the contents of the write register is satisfied (namely, they have a particular difference), the memory apparatus 10 may be access-permitted. In addition, besides a non-volatile semiconductor memory (OTP) as a reversely non-writable memory, a storage medium such as a write once type optical disc may be used. In the case of the storage medium, an area on the innermost periphery of the disc (the area is referred to as the lead-in area) is equivalent to the boot area.

According to the present invention, when the designated area is in the initial state, the memory is not access-restricted. Thus, all the areas of the memory can be accessed. To improve the secrecy of data stored in the memory, by writing an access code to the designated area, the memory is access-restricted. When the memory has been access-restricted, by writing a code corresponding to the access code to the memory apparatus, the access state of the memory can be changed to the access-permitted state. Since the memory apparatus is a reversibly non-writable memory, the access code written to the designated area can be prevented from being forged. Thus, according to the present invention, recorded data can be securely kept secret.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A memory apparatus, comprising:
   a reversibly non-writable memory having a designated area and a memory area;
   a detecting unit operable to determine whether said designated area is in an initial state;
   an access controlling portion coupled to said memory area by a pair of gates disposed in parallel between said access controlling portion and said memory area, said access controlling portion controlling operations of reading from or writing to said memory area; and
   a controller operable to permit access to said designated area and said memory area of said memory when said detecting unit determines that said designated area is in said initial state, and to prohibit access to said designated area and said memory area of said memory when said detecting unit determines that said designated area is not in said initial state.

2. The memory apparatus as claimed in claim 1, wherein said designated area is converted from said initial state to a different state when predetermined data is written to said designated area.

3. The memory apparatus as claimed in claim 2, wherein, when said designated area is not in said initial state, said controller is operable to permit access to said memory area of said memory upon input of data satisfying a predetermined condition with respect to said predetermined data written in said designated area.

4. The memory apparatus as claimed in claim 1, wherein attribute information is recorded in a separate area of said memory that is always accessible, said attribute information including information indicating whether said memory has been access-restricted.

5. A method for restricting access to a reversibly non-writable memory apparatus, comprising:
   determining an access state of the memory apparatus;
   when the memory apparatus is in an access-restricted state, changing the access state of the memory apparatus to an access-permitted state including inputting data satisfying a predetermined condition with respect to predetermined data written in a designated area; and turning on a gate disposed in parallel between an access controlling portion and a memory portion of the memory apparatus.

6. The access restricting method as claimed in claim 5, wherein the step of determining the access state of the memory apparatus includes inputting a write command or a read command to the memory apparatus and determining that the memory apparatus is in the access-restricted state when an error is returned from the memory apparatus.

7. A method for restricting access to a reversibly non-writable memory apparatus, comprising:

determining an access state of the memory apparatus;

changing the access state of the memory apparatus from an access-permitted state to an access-restricted state, including writing predetermined data to a designated area of the memory apparatus so as to convert the designated area from an initial state to a different state; and turning off a gate disposed in parallel between an access controlling portion and a memory portion of the memory apparatus.

8. The method for restricting access as claimed in claim 7, wherein determining the access state of the memory apparatus includes inputting a write command or a read command to the memory apparatus and determining that the memory apparatus is in the access-restricted state if an error is returned from the memory apparatus.

9. A combination, comprising:

a host data processing device; and a memory apparatus connectable to said host data processing device and including a reversibly non-writable memory having a designated area and a memory area, a detecting unit operable to determine whether said designated area is in an initial state, an access controlling portion coupled to said memory area by a pair of gates disposed in parallel between said access controlling portion and said memory area, said access controlling portion controlling operations of reading from or writing to said memory area, and a controller operable to permit access to said designated area and said memory area when said detecting unit determines that said designated area is in said initial state, and to prohibit access to said designated area and said memory area when said detecting unit determines that said designated area is not in said initial state.

10. The combination as claimed in claim 9, wherein said host data processing device is connected to said memory apparatus through a serial interface.

11. The combination as claimed in claim 9, wherein said host data processing device includes a data processing portion coupled to control circuitry.

12. The combination as claimed in claim 11, wherein said data processing portion generates data that is written to said memory apparatus.

13. The combination as claimed in claim 11, wherein said data processing portion reads data from said memory apparatus.

14. The combination as claimed in claim 13, wherein said data processing portion further processes the data read from said memory apparatus.

15. The combination as claimed in claim 9, wherein said host data processing device comprises a digital electronic camera and said memory apparatus comprises a memory card that is detachably engageable with said digital electronic camera.

16. The combination as claimed in claim 9, wherein said host data processing device comprises a digital audio device and said memory apparatus comprises a memory card that is detachably engageable with said digital audio device.

17. The combination as claimed in claim 9, wherein said designated area is converted from said initial state to a different state when predetermined data is written to said designated area.

18. The combination as claimed in claim 9, wherein, when said designated area is not in said initial state, said controller is operable to permit access to said memory area of said memory upon input of data satisfying a predetermined condition with respect to said predetermined data written in said designated area.

19. The combination as claimed in claim 9, wherein attribute information is recorded in a separate area of said memory that is always accessible, said attribute information including information indicating whether said memory has been access-restricted.

* * * * *